US005902482A

United States Patent [19]
Seeley et al.

[11] Patent Number: 5,902,482
[45] Date of Patent: *May 11, 1999

[54] BACK-FLUSHABLE FILTER CARTRIDGE AND METHOD OF BACK-FLUSHING SAME

[75] Inventors: William P. Seeley, Shrewsbury; Lillo C. Brocato, Felton, both of Pa.; Anthony C. Shucosky, Timonium, Md.

[73] Assignee: USF Filtration & Separations Group, Inc., Timonium, Md.

[*] Notice: This patent issued on a continued prosecution application filed under 37 CFR 1.53(d), and is subject to the twenty year patent term provisions of 35 U.S.C. 154(a)(2).

[21] Appl. No.: 08/744,863

[22] Filed: Nov. 7, 1996

Related U.S. Application Data

[60] Provisional application No. 60/006,507, Nov. 9, 1995.

[51] Int. Cl.$^6$ .................................................. B01D 27/06
[52] U.S. Cl. ............................. 210/493.1; 210/193
[58] Field of Search .......................... 210/282, 266, 210/493.1, 493.2, 493.5, 321.86, 411, 193, 678; 55/302, 521, 304

[56] References Cited

U.S. PATENT DOCUMENTS

| | | | |
|---|---|---|---|
| 1,703,535 | 2/1929 | Manning | 210/193 |
| 2,347,927 | 5/1944 | Paterson et al. | 210/193 |
| 2,413,991 | 1/1947 | Newman | 210/493.1 |
| 3,520,417 | 7/1970 | Durr et al. | 210/266 |
| 3,567,303 | 3/1971 | Loeffler | 210/22 |
| 3,682,318 | 8/1972 | Rigopulos | 210/321 |
| 3,853,509 | 12/1974 | Leliaert | 55/341 |
| 3,994,810 | 11/1976 | Schaeffer | 210/103 |
| 4,114,794 | 9/1978 | Storms | 278/182 |
| 4,126,560 | 11/1978 | Marcus et al. | 210/489 |
| 4,139,468 | 2/1979 | Rosaen | 210/130 |
| 4,154,688 | 5/1979 | Pall | 210/487 |
| 4,169,059 | 9/1979 | Storms | 210/493 R |
| 4,263,139 | 4/1981 | Erlich | 210/169 |
| 4,290,889 | 9/1981 | Erickson | 210/484 |
| 4,488,966 | 12/1984 | Schaeffer | 210/485 |
| 4,735,720 | 4/1988 | Keersting | 210/493.5 |
| 4,790,942 | 12/1988 | Shmidt et al. | 210/650 |
| 4,863,602 | 9/1989 | Johnson | 210/484 |
| 4,904,380 | 2/1990 | Bhanot et al. | 210/193 |
| 4,954,255 | 9/1990 | Müller et al. | 210/437 |
| 5,092,990 | 3/1992 | Muramatsu et al. | 210/136 |
| 5,104,534 | 4/1992 | Branchcomb | 210/315 |
| 5,154,827 | 10/1992 | Ashelin et al. | 210/490 |
| 5,203,998 | 4/1993 | Benian | 210/493.5 |
| 5,376,278 | 12/1994 | Salem | 210/679 |
| 5,446,974 | 9/1995 | Gubler | 34/82 |
| 5,468,397 | 11/1995 | Barboza et al. | 210/798 |
| 5,543,047 | 8/1996 | Stoyell et al. | 210/493.2 |
| 5,725,784 | 3/1998 | Geibel et al. | 210/791 |

*Primary Examiner*—Cynthia L. Nessler
*Attorney, Agent, or Firm*—Nixon & Vanderhye P.C.

[57] ABSTRACT

A back-flushable filter cartridge includes a cylindrical exterior fluid-permeable filter media cage, a cylindrical interior fluid-permeable core element coaxially disposed within the filter media cage so as to establish therebetween an interior space, and longitudinally pleated filter media surrounding the core element and disposed in the interior space such that individual pleats thereof extend substantially radially outwardly from the core element. An annular space is established between outer longitudinal folds of the pleated filter media and the filter media cage. The pleated filter media is radially expandable into the established annular space to allow individual adjacent pleats of the pleated filter media to circumferentially separate from one another in response to fluid flowing in a radial direction from the core element toward the filter media cage.

5 Claims, 2 Drawing Sheets

BACK-FLUSHABLE FILTER CARTRIDGE AND METHOD OF BACK-FLUSHING SAME

This application is a complete application filed pursuant to 35 USC §111 (a) which is based on, and claims domestic priority benefits from, U.S. Provisional Application Ser. No. 60/006,507 filed on Nov. 9, 1995.

FIELD OF INVENTION

This invention relates generally to the field of filter cartridges. In preferred forms the present invention is embodied in a filter cartridge having longitudinally pleated filter media which is capable of being subjected to reverse flow (i.e., back-flushed) to thereby remove particulates that have become trapped in the filter media and thereby allow the filter cartridge to remain in service.

BACKGROUND AND SUMMARY OF THE INVENTION

Disposable filter cartridges having longitudinally pleated filtration media are well known. In this regard, disposable filter cartridges are conventionally provided with an external cylindrical cage and a central core element coaxially positioned within the cage so as to define an interior cylindrical annulus which is completely occupied by the pleated filter media. Please see generally in this regard, U.S. Pat. Nos. 5,145,827 to Ashelin et al, and 4,154,688 to Pall (the entire content of each being expressly incorporated hereinto by reference). The cage and the core element are provided with openings, apertures and the like so as to allow fluid to flow normally in a radial direction through the external cage, pleated filter media and core element in that order. The filtered fluid may then be discharged axially from the filter cartridge through a coaxially disposed discharge opening in one of the filter cartridge's end caps.

In some industrial environments, it may be desirable to reverse the normal flow of the fluid through the filter cartridge so as to dislodge and remove accumulated particulates on the surface of the pleated filter media so that the filter cartridge substantially (if not completely) regains its initial filtration capabilities and/or so that fresh particulates may be precoated onto the filter media's surface. For example, in some industries (e.g., the power generation industry), filtration cartridges having filter media precoated with ion exchange particles are sometimes used. Thus, it would be desirable if exhausted ion exchange particles could be removed from the filter media via back-flushing so that fresh ion exchange particles could then be recoated onto the filter media's surface. It is towards fulfilling such a need that the present invention is directed.

Broadly, the present invention is directed to a back-flushable disposable filter cartridge. More particularly, the present invention is embodied in a filter cartridge whereby a generally cylindrical, longitudinally pleated, filter media is positioned within the external filter media cage such that an annular space is defined therebetween. The annular space also serves to prevent blockage of particulates from occurring (e.g., ion-exchange particles) when coated on the filter media's surface. That is, the annular space serves as a free passageway for the particulates which is especially important when ion exchange resin particles and/or other particulate species are precoated onto the filter media. That is, the annular space allows such precoat particulates to move between the outer support cage and the pleated filter media surface such that the resin can form a uniform coating of resin over the media surface. Without the annular space, the particulates will preferentially coat the areas of the filter media exposed directly adjacent to the open void spaces of the solid outer protective cage. The areas under the solid portion of the outer protective cage will thus be coated nonuniformly. The particulates will also have the tendency in the absence of the annular space to cover the solid (non-apertured) portions of the outer support cage structure thereby resulting in nonuniform coverage. Less than optimum flow channels will result and inefficient use of the precoat particulates will occur.

In addition to the above advantages, the annular space allows the pleated media to radially expand thereby assisting in the release and removal of trapped particulates from the filter media's surface. This feature is especially important to allow the filter cartridge to be regenerated in situ with precoat particulates—that is, so that spent precoat particulates may be expelled from the filter media and again coated with fresh precoat particulates.

These and other aspects of the invention will become more clear after careful consideration is given to the following detailed description of the preferred exemplary embodiments thereof which follow.

BRIEF DESCRIPTION OF THE DRAWINGS

Reference will hereinafter be made to the accompanying drawings wherein like reference numerals throughout the various FIGURES denote like structural elements, and wherein.

DETAILED DESCRIPTION OF THE PREFERRED EXEMPLARY EMBODIMENTS

Figure 1:
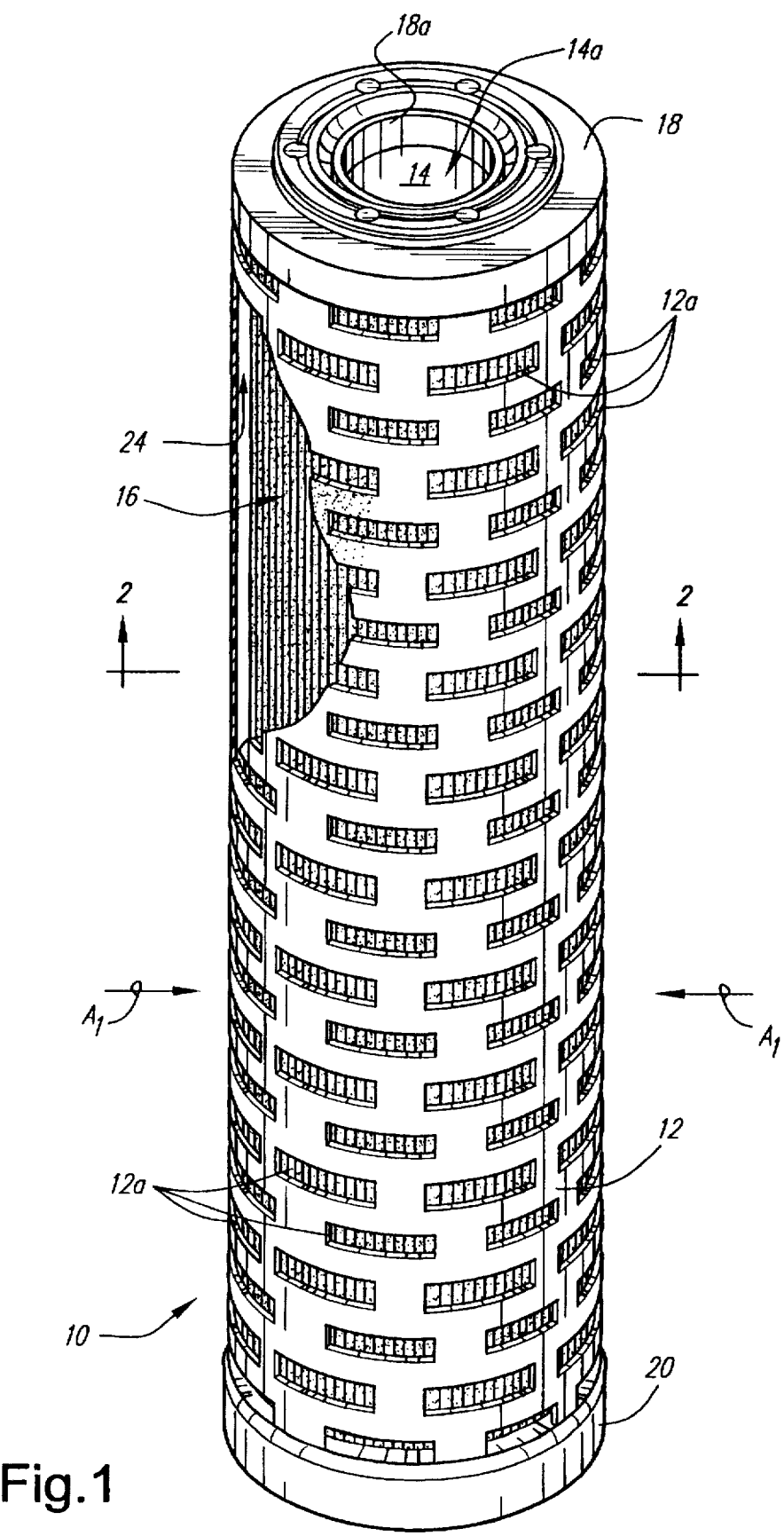
FIG. 1 is a perspective view, partly in section, of a backflushable filter cartridge according to the present invention.
Figure 2:
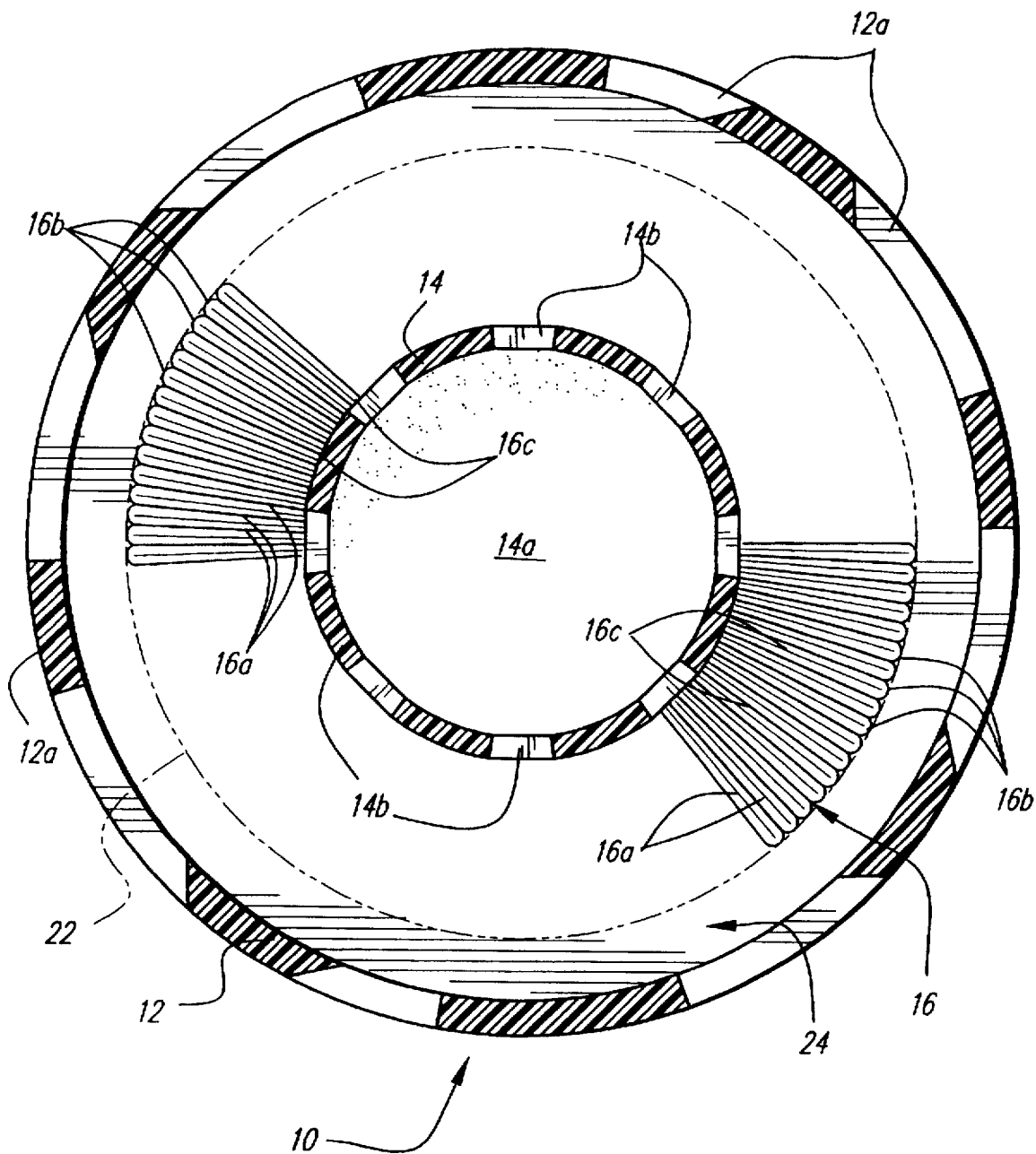
FIG. 2 is a cross-sectional view of the filter cartridge shown in FIG. 1 as taken along lines 2—2 therein.

Accompanying FIGS. 1 and 2 depict a particularly preferred embodiment of a filter cartridge 10 according to the present invention. Specifically, the filter cartridge 10 includes a rigid apertured cylindrical external filter media cage 12 in which a rigid internal cylindrical core element 14 having a central passageway 14a is coaxially disposed. A longitudinally pleated filter media 16 is positioned within the interior space between the cage 12 and core element 14 such that the individual pleats thereof (a few of which are identified by reference numeral 16a) extend in the same direction as, and are oriented radially relative to, the filter cartridge's longitudinal axis. The rigid external filter media cage 12 and central core 14 are each provided with apertures 12a, 14b so as to allow fluid to flow therethrough. The apertures 12a of the external filter media cage 12 are most preferably arranged as an array of circumferentially oriented slots.

The filter cartridge may be provided with a pair of end caps 18, 20. One of the end caps, for example, end cap 20, may be solid, while the other end cap, for example end cap 18, may be provided with a discharge opening 18a coaxially aligned with the interior central passageway 14a of the internal core element 14. As such, the fluid may flow normally through the external cage 12, filter media 16 and central core 14 in that order, and then be discharged from the filter cartridge 10 through the central passageway 14a and discharge opening 18a.

The particular filter media 16 which is employed in the practice of this invention is not critical. Thus, any conventional pleated non-woven fibrous filter media may be employed having the desired porosity (See in this regard, U.S. Pat. No. 4,735,720 to Kersting, the entire content of which is expressly incorporated hereinto by reference). A single sheet of such filter media may be used. Alternatively, a plurality of filter media sheets may be employed, in which case an upstream filter sheet may have a coarser porosity as compared to the porosity of a downstream filter sheet so as to obtain the desired filtration properties. Of course, multiple filter sheets whereby an upstream filter sheet has a porosity which is finer than that of a downstream filter sheet may also be employed. Therefore, depending upon the environment of use, the porosity of the filter media may be "engineered" as desired.

As can be seen particularly in FIG. 2, adjacent pleats 16a of the filter media 16 are in contact with one another so that the respective peaks 16b established by outer longitudinal folds of the adjacent pleats are likewise in closely adjacent contacting relationship. In such a manner, the peaks 16b establish a cylindrical outer region of the filter media (shown in FIG. 2 by the chain line 22). Similarly, the respective valleys 16c established by inner longitudinal folds of the adjacent pleats 16a are in closely adjacent contacting relationship so as to establish a cylindrical inner region of the filter media which is in contact with and surrounds the core element 14. As such, the individual pleats 16a of the filter media longitudinally radiate from the core element 14.

Important to this invention, an annular space 24 is established between the interior surface of the filter media cage 12 and the cylindrical exterior region 22 of the filter media 16 defined by the outer longitudinal folds of the adjacent pleats 16a. The annular space is most preferably has a radial dimension which is between about 10% to about 40% (preferably between about 25% to about 35%) of the radial (latitudinal cross-sectional) dimension of the pleated filter media 16.

This substantial annular space 24 thereby allows particles to flow into the filter media where they may be trapped without clogging of the filter cartridge. In addition, the annular space 24 allows the filter media to expand radially during a back-flushing operation so that the individual adjacent pleats 16a circumferentially separate from one another. When the filter media is in such a radially expanded condition, any particulates (e.g., spent ion exchange particles) trapped therein will be removed from the filter cartridge by the reverse flow of fluid through the filter media.

In use, fluid (e.g., gas and/or liquid) will normally flow in a radial direction (arrows A₁ in FIG. 1) from the exterior of the filter media cage 12, toward the central passageway 14a. Particulates carried by the fluid will thus be trapped by the filter media-1 6 when the fluid flows therethrough. When desired, therefore, these trapped particulates may be removed from the filter cartridge by reversing the normal flow of fluid therethrough. That is, during a back-flushing operation, the fluid will flow in a radial direction from the passageway 14a toward the exterior of the filter media cage 12 (i.e., a reverse direction to arrows A₁). The filter media will therefore radially-expand under the pressure of the reverse fluid flow so as to allow trapped particulates to be entrained in the fluid and thereby removed from the filter cartridge. Appropriate piping associated with the filter cartridge housing (not shown) may be provided to ensure that the particulate-laden fluid removed from the filter cartridge is transferred to an appropriate location for disposal or recovery. Upon completion of the back-flushing cycle, the fluid may then be caused to flow in its normal direction (arrows A₁) through the filter cartridge whereby normal operation may again commence.

Although the present invention has been shown and described in terms of a particularly preferred embodiment thereof whereby the annular space is defined physically between the folds of the filter media and the rigid cage, in some end use environments it may be desirable or necessary for the filter media to be positioned immediately adjacent the cage and the annular space defined between the filter media and the core element. Thus, those in this art could modify the filter cartridge as shown in the accompanying drawings and described above so that the annular space is defined between the filter media and the core element without undue experimentation.

Thus, while the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A back-flushable filter cartridge comprising:

an exterior filter media cage having a rigid solid cylindrical wall in which a plurality of open apertures are formed to allow fluid to pass through said wall thereof;

a cylindrical interior fluid-permeable core element coaxially disposed within said filter media cage so as to establish therebetween an interior space;

longitudinally pleated filter media surrounding said core element and disposed in said interior space such that individual pleats thereof are in contact with one another so that respective peaks established by outer longitudinal folds of adjacent ones of said individual pleats are in closely adjacent contacting relationship with one another and extend substantially radially outwardly from said core element by a predetermined radial dimension to establish a cylindrical outer region of said filter media, and such that respective valleys established by inner longitudinal folds of said adjacent ones of said individual pleats are in closely adjacent contacting relationship so as to establish a cylindrical inner region of the filter media; wherein said cylindrical inner region established by said inner longitudinal folds of said adjacent ones of said individual pleats is in contact with said core element; and wherein said cylindrical outer region established by said outer longitudinal folds of said adjacent ones of said individual pleats defines an annular space between said outer longitudinal folds of said pleated filter media and said filter media cage; wherein said annular space has a radial dimension which is between about 10% to about 40% of the radial dimension of said individual pleats of said pleated filter media and sufficient to prevent preferential coating of particulates on said filter media exposed directly adjacent to said apertures formed in said filter cage wall; and wherein said pleated filter media is radially expandable into said established annular space to allow individual adjacent pleats of said pleated filter media to circumferentially separate from one another in response to fluid flowing in a radial direction from said core element toward said filter media cage.

2. The filter cartridge as in claim 1, wherein said annular space is established between outer longitudinal folds of said pleated filter media and said filter media cage.

3. The filter cartridge as in claim 1, wherein said filter media includes at least one sheet of a non-woven fibrous filter.

4. The filter cartridge as in claim 1, further comprising a pair of end caps each positioned at a respective end of said filter cartridge, at least one of said end caps having a discharge opening in fluid-communication with an interior passageway of said core element.

5. The filter cartridge as in claim 1, wherein said apertures are arranged as an array of circumferentially oriented slots.

* * * * *